US012783411B2

(12) United States Patent
Upadhyay et al.

(10) Patent No.: US 12,783,411 B2
(45) Date of Patent: Nov. 3, 2026

(54) SYSTEM AND METHODS FOR ADAPTIVE PROGRAM-VERIFY CONTROL IN NAND PROGRAMMING

(71) Applicant: SK hynix Inc., Gyeonggi-do (KR)

(72) Inventors: Sagar Rajendrabhai Upadhyay, San Jose, CA (US); Ahsanur Rahman, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 29 days.

(21) Appl. No.: 19/090,414

(22) Filed: Mar. 26, 2025

(65) Prior Publication Data

US 2026/0300170 A1 Oct. 1, 2026

(51) Int. Cl.
*G06F 12/00* (2006.01)
*G06F 12/06* (2006.01)

(52) U.S. Cl.
CPC .. *G06F 12/0646* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 7,499,332 | B2 | 3/2009 | Crippa et al. | |
| 10,403,366 | B1 * | 9/2019 | Tabrizi | G11C 11/56 |
| 11,908,532 | B2 | 2/2024 | Kim et al. | |
| 2023/0400986 | A1 | 12/2023 | Choi et al. | |
| 2024/0170078 | A1 | 5/2024 | Lee et al. | |

* cited by examiner

*Primary Examiner* — Midys Rojas
(74) *Attorney, Agent, or Firm* — IP&T GROUP LLP

(57) ABSTRACT

A method for programming memory cells in a memory and the associated memory system. The method applies program pulses to the memory cells, applies a series of program-verify pulses to the memory cells to identify the memory cells having improper voltage thresholds short of the program-verify pulse levels, for the memory cells having the improper voltage thresholds, applies a non-zero bias to bit lines of the memory cells to program the memory cells, having the improper voltage thresholds, to proper voltage thresholds, and selectively determines which memory cells are first subject to both the program pulses and the program-verify pulses based on a programming speed of the memory cells.

19 Claims, 14 Drawing Sheets

600

$$H = \begin{bmatrix} 1 & 0 & 1 & 0 & 0 & 1 \\ 1 & 1 & 0 & 0 & 1 & 0 \\ 1 & 0 & 0 & 1 & 0 & 0 \\ 0 & 1 & 0 & 1 & 0 & 1 \end{bmatrix}$$

FIG. 11

| LOOP# | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
|---|---|---|---|---|---|---|---|---|---|---|---|---|---|---|---|---|---|---|---|---|---|---|---|---|
| PV1 | [O] | O | O | O | O | | | | | | | | | | | | | | | | | | | 5 |
| PV2 | | [O] | O | O | O | O | O | | | | | | | | | | | | | | | | | 6 |
| PV3 | | | | [O] | O | O | O | O | | | | | | | | | | | | | | | | 5 |
| PV4 | | | | | [O] | O | O | O | O | | | | | | | | | | | | | | | 5 |
| PV5 | | | | | | [O] | O | O | O | O | | | | | | | | | | | | | | 5 |
| PV6 | | | | | | | [O] | O | O | O | O | | | | | | | | | | | | | 5 |
| PV7 | | | | | | | | [O] | O | O | O | O | | | | | | | | | | | | 5 |
| PV8 | | | | | | | | | [O] | O | O | O | O | | | | | | | | | | | 5 |
| PV9 | | | | | | | | | | [O] | O | O | O | O | | | | | | | | | | 5 |
| PV10 | | | | | | | | | | | [O] | O | O | O | O | | | | | | | | | 5 |
| PV11 | | | | | | | | | | | | [O] | O | O | O | O | | | | | | | | 5 |
| PV12 | | | | | | | | | | | | | [O] | O | O | O | O | | | | | | | 5 |
| PV13 | | | | | | | | | | | | | | [O] | O | O | O | O | | | | | | 5 |
| PV14 | | | | | | | | | | | | | | | [O] | O | O | O | O | | | | | 5 |
| PV15 | | | | | | | | | | | | | | | | | [O] | O | O | O | O | | | 5 |
| #VFY | 1 | 2 | 2 | 3 | 4 | 4 | 5 | 5 | 5 | 5 | 5 | 5 | 5 | 5 | 5 | 4 | 4 | 3 | 2 | 1 | 1 | 0 | 0 | 76 |

[O] = skip Main-VFY

FIG. 13

| LOOP# | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
|---|---|---|---|---|---|---|---|---|---|---|---|---|---|---|---|---|---|---|---|---|---|---|---|---|
| PV1 | O | O | O | O | O | | | | | | | | | | | | | | | | | | | 5 |
| PV2 | | O | O | O | O | O | O | | | | | | | | | | | | | | | | | 6 |
| PV3 | | | | O | O | O | O | O | | | | | | | | | | | | | | | | 5 |
| PV4 | | | | | O | O | O | O | O | | | | | | | | | | | | | | | 5 |
| PV5 | | | | | | O | O | O | O | O | | | | | | | | | | | | | | 5 |
| PV6 | | | | | | | O | O | O | O | O | | | | | | | | | | | | | 5 |
| PV7 | | | | | | | | O | O | O | O | O | | | | | | | | | | | | 5 |
| PV8 | | | | | | | | | O | O | O | O | O | | | | | | | | | | | 5 |
| PV9 | | | | | | | | | | O | O | O | O | O | | | | | | | | | | 5 |
| PV10 | | | | | | | | | | | O | O | O | O | O | | | | | | | | | 5 |
| PV11 | | | | | | | | | | | | O | O | O | O | O | | | | | | | | 5 |
| PV12 | | | | | | | | | | | | | O | O | O | O | O | | | | | | | 5 |
| PV13 | | | | | | | | | | | | | | O | O | O | O | O | | | | | | 5 |
| PV14 | | | | | | | | | | | | | | | O | O | O | O | O | | | | | 5 |
| PV15 | | | | | | | | | | | | | | | | | O | O | O | O | O | | | 5 |
| #VFY | 1 | 2 | 2 | 3 | 4 | 4 | 5 | 5 | 5 | 5 | 5 | 5 | 5 | 5 | 5 | 4 | 4 | 3 | 2 | 1 | 1 | 0 | 0 | 76 |

| REGISTER NAME | REGISTER SETTINGS | STEP1 START LOOP | STEP2 START_LOOP | END LOOP (PV-PASS LOOP) |
|---|---|---|---|---|
| | | | | |
| DYN_DPGM_START_LOOP_PV1 | 3 | 3 | 4 | 5 |
| DYN_DPGM_START_LOOP_PV2 | 2 | 3 | 4 | 7 |
| DYN_DPGM_START_LOOP_PV3 | 5 | 8 | n/a | 8 |
| DYN_DPGM_START_LOOP_PV4 | 4 | 8 | 9 | 9 |
| DYN_DPGM_START_LOOP_PV5 | 6 | n/a | n/a | 10 |
| DYN_DPGM_START_LOOP_PV6 | 2 | 8 | 9 | 11 |
| DYN_DPGM_START_LOOP_PV7 | 3 | 10 | 11 | 12 |
| DYN_DPGM_START_LOOP_PV8 | 3 | 11 | 12 | 13 |
| DYN_DPGM_START_LOOP_PV9 | 2 | 11 | 12 | 14 |
| DYN_DPGM_START_LOOP_PV10 | 1 | 11 | 12 | 15 |
| DYN_DPGM_START_LOOP_PV11 | 4 | 15 | 16 | 16 |
| DYN_DPGM_START_LOOP_PV12 | 3 | 15 | 16 | 17 |
| DYN_DPGM_START_LOOP_PV13 | 1 | 14 | 15 | 18 |
| DYN_DPGM_START_LOOP_PV14 | 3 | 17 | 18 | 19 |
| DYN_DPGM_START_LOOP_PV15 | 4 | 20 | 21 | 21 |

SYSTEM AND METHODS FOR ADAPTIVE PROGRAM-VERIFY CONTROL IN NAND PROGRAMMING

BACKGROUND

1. Field

Embodiments of the present disclosure relate to memory systems, and methods of operating such systems, particularly to the operation of solid state drives.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller which includes the electronics that bridge the flash memory components to the SSD input/output (I/O) interfaces. The SSD controller can include an embedded processor that can execute functional components such as firmware (FW). The SSD functional components are device specific, and in most cases, can be updated.

The two main types of flash memory components are named after the NAND and NOR logic gates. The individual flash memory cells exhibit internal characteristics similar to those of their corresponding gates. The NAND-type flash memory may be written and read in blocks (or pages) which are generally much smaller than the entire memory space. The NOR-type flash memory allows a single machine word (byte) to be written to an erased location or read independently. The NAND-type flash memory operates primarily in memory cards, USB flash drives, solid-state drives, and similar products, for general storage and transfer of data.

NAND flash-based storage devices have been widely adopted because of their faster read/write performance, lower power consumption, and shock proof features. In general, however, they are more expensive compared to hard disk drives (HDD). To bring costs down, NAND flash manufacturers have been pushing the limits of their fabrication processes towards 20 nm and lower.

In this context, embodiments of the present invention arise.

SUMMARY

Aspects of the present invention include a method for programming memory cells in a memory system. The method applies program pulses to the memory cells, applies a series of program-verify pulses to the memory cells to identify the memory cells having improper voltage thresholds short of the program-verify pulse levels, for the memory cells having the improper voltage thresholds, applies a non-zero bias to bit lines of the memory cells to program the memory cells, having the improper voltage thresholds, to proper voltage thresholds, and selectively determines which memory cells are first subject to both the program pulses and the program-verify pulses based on a programming speed of the memory cells.

Further aspects of the present invention include a memory system having a memory device; and a controller in communication with the memory device. The controller is configured to apply program pulses to the memory cells, apply a series of program-verify pulses to the memory cells to identify the memory cells having improper voltage thresholds short of the program-verify pulse levels, for the memory cells having the improper voltage thresholds, apply a non-zero bias to bit lines of the memory cells to program the memory cells, having the improper voltage thresholds, to proper voltage thresholds, and selectively determine which memory cells are first subject to both the program pulses and the program-verify pulses based on a programming speed of the memory cells.

Other features, aspects and advantages of the present invention will become clear in view of the following description and accompanying the drawings.

BRIEF DESCRIPTION OF THE DRAWINGS

FIG. 11 is a diagram detailing PV pulse and loop controls in accordance with one embodiment of the present invention.

FIG. 13 is another diagram detailing PV pulse and loop controls in accordance with one embodiment of the present invention.

DETAILED DESCRIPTION

Figure 1:
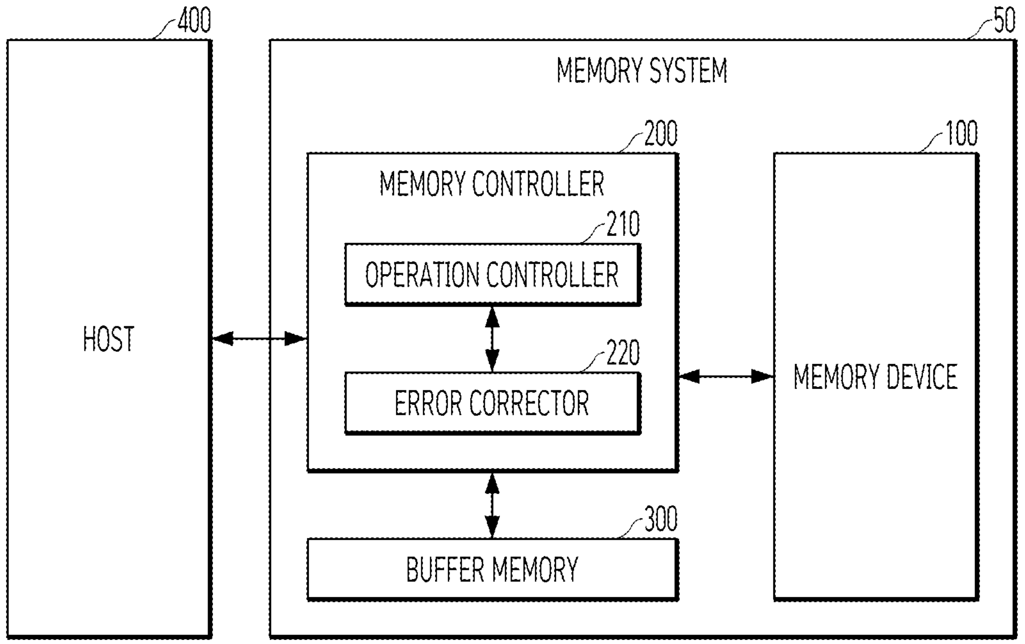
FIG. 1 is a diagram illustrating a memory system according to an embodiment of the present disclosure.

Various embodiments are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrases is not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a diagram illustrating a memory system according to an embodiment of the present disclosure. Referring to FIG. 1, the memory system 50 may include a memory device 100, a memory controller 200, and a buffer memory 300. The memory system 50 may be a device that stores data under the control of a host 400 such as a cellular phone, a smartphone, an MP3 player, a laptop computer, a desktop computer, a game player, a TV, a tablet PC, or an in-vehicle infotainment system. The memory system 50 may be manufactured as one of various types of storage devices according to a host interface that is a communication method with the host 400. For example, the memory system 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The memory system 50 may be manufactured as any of various types of packages. For example, the memory system 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may operate under the control of the memory controller 200. The memory device 100 may include a memory cell array including a plurality of memory cells that store data.

In one embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

The memory device 100 may be configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. The memory device 100 may program, read, or erase data in the area selected by the address.

The memory controller 200 may control an overall operation of the memory system 50.

When power is applied to the memory system 50, the memory controller 200 may execute firmware (FW). In one embodiment, the memory controller 200 may execute firmware to control communication between the host 400 and the memory device 100. In one embodiment, the memory controller 200 may convert a logical block address of the host into a physical block address of the memory device.

The memory controller 200 may control the memory device 100 to perform the write operation, the read operation, the erase operation, or the like according to a request of the host 400. The memory controller 200 may provide a command, a physical block address, or data to the memory device 100 according to the write operation, the read operation, or the erase operation.

In one embodiment, the memory controller 200 may generate a command, an address, and data independently regardless of the request from the host 400 and transmit the command, the address, and the data to the memory device 100. For example, the memory controller 200 may provide the command, the address, and the data for performing the read operation and the write operations accompanying in performing wear leveling, read reclaim, garbage collection, and the like, to the memory device 100.

In one embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The buffer memory 300 may temporarily store data provided from the host 400 or temporarily store data read from the memory device 100. In one embodiment, the buffer memory 300 may be a volatile memory device. For example, the buffer memory 300 may be a dynamic random access memory (DRAM) or a static random access memory (SRAM). In one embodiment, the buffer memory 300 may be positioned outside the memory controller 200, or may be positioned inside the memory controller 200. In another embodiment, the buffer memory 300 may be positioned outside the memory system 50.

In one embodiment, the buffer memory 300 may store meta data. The meta data may be data including information used to operate the memory system 50. In one embodiment, the meta data may include map data indicating a corresponding relationship between a logical address of the host 400 and the physical address of the memory device 100.

In one embodiment, the buffer memory 300 may store information including a fail count read from the memory device 100. The information including the fail count may include the number of times a cache read operation on each memory block is failed.

In one embodiment, the information including the fail count may include the number of times a read retry operation is performed after the cache read operation on each memory block is failed. The information including the fail count may be updated when the cache read operation is failed.

The information including the fail count may further include read mode information. The read mode information may be read mode information for each memory block. The read mode information may include cache read allow information or cache read inhibit information. The cache read allow information may be information indicating that the cache read operation may be performed on a corresponding memory block. The cache read inhibit information may be information indicating that the cache read operation may not be performed on a corresponding memory block.

In one embodiment, when the fail count of a memory block is less than the reference count, the read mode information of a memory block may include the cache read allow information. In another embodiment, when the fail count of another memory block is equal to or greater than the reference count, the read mode information of the other memory block may include the cache read inhibit information.

In one embodiment, the memory controller 200 may include an operation controller 210 and an error corrector 220. The operation controller 210 may control the write, read, and erase operations on the memory device 100. In one embodiment, the operation controller 210 may read the data stored in the memory device 100 in response to a read request from the host 400. In one embodiment, the operation controller 210 may control the memory device 100 to perform a normal read operation or the cache read operation in response to the read request from the host 400.

The cache read operation may be an operation of sensing data stored in another page while outputting data stored in one page among a plurality of pages included in a selected memory block to the memory controller 200. In one embodiment, the cache read operation may be performed when a physical address of the one page and a physical address of the other page are consecutive sequential addresses. In one embodiment, the operation controller 210 may control the memory device 100 to perform the cache read operation when physical addresses of pages in which data corresponding to the read request of the host 400 are stored are consecutive addresses. In another embodiment, the operation controller 210 may control the memory device 100 to perform the cache read operation according to a preset condition regardless of the physical addresses of the pages in which the read requested data is stored.

The normal read operation may be an operation of outputting data stored in one page among the plurality of pages included in the memory device 100 to the memory controller 200 and sensing data stored in another page. In one embodiment, the operation controller 210 may control the memory device 100 to perform the normal read operation when the physical addresses of the pages in which the data corresponding to the read request of the host 400 are stored are not consecutive addresses.

In one embodiment, the operation controller 210 may provide a cache read command to the memory device 100 when the cache read operation is required. The operation controller 210 may receive the data read by the cache read operation from the memory device 100. The operation controller 210 may provide the data read by the cache read operation to the error corrector 220.

The error corrector 220 may perform an error correction operation of correcting an error of the data read by the cache read operation. When the number of error bits included in the data read by the cache read operation is less than the reference number of correctable error bits, the error correction operation may be passed. When the error correction operation is passed, the error corrector 220 may provide error corrected data to the operation controller 210, and the operation controller 210 may provide the error corrected data to the host 400.

However, when the number of error bits included in the data read by the cache read operation is greater than the reference number of correctable error bits, the error correction operation may be failed. The error corrector 220 may provide a signal to the operation controller 210 indicating that the error correction operation on the data read by the cache read operation is failed.

When the error correction operation on the data read by the cache read operation is failed, the operation controller 210 may control the memory device 100 to perform the read retry operation. The read retry operation may be an operation of reading the data stored in the memory device 100 using a read voltage different from a default read voltage used in the cache read operation. In one embodiment, the operation controller 210 may control the memory device 100 to perform the read retry operation using read retry voltages greater or less than a default voltage by an offset voltage. The operation controller 210 may provide the data read by the read retry operation to the error corrector 220. The error corrector 220 may provide the error corrected data to the operation controller 210 when the number of error bits included in the data read by the read retry operation is less than the reference number of error bits, and the operation controller 210 may provide the error corrected data to the host 400. That is, when the error correction for the data obtained by the cache read operation is failed, the cache read operation may be failed and the read retry operation may be performed.

In one embodiment, the operation controller 210 may count the number of times the error correction on the data read by the cache read operation is failed and the read retry operation is performed. When the error correction of the data read by the cache read operation is failed, the operation controller 210 may increase the fail count of the memory block on which the cache read operation is performed.

The operation controller 210 may update the read mode information of the memory block based on a result of comparing the fail count of the memory block and the reference count. In one embodiment, when the fail count of the memory block is equal to or greater than the reference count, the operation controller 210 may update the read mode information of the memory block to the cache read inhibit information.

The operation controller 210 may control the memory device 100 to perform the normal read operation or the cache read operation based on the read mode information of the memory block in which the data corresponding to the read request from the host 400 is stored. In one embodiment, when the read mode information of the memory block in which the data corresponding to the read request of the host 400 is stored includes the cache read inhibit information, the operation controller 210 may control the memory device 100 to read the data through the normal read operation. In another embodiment, when the read mode information of the memory block in which the data corresponding to the read request of the host 400 is stored includes the cache allow information, the operation controller 210 may control the memory device 100 to read the data through the cache read operation.

The host 400 may communicate with the memory system 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
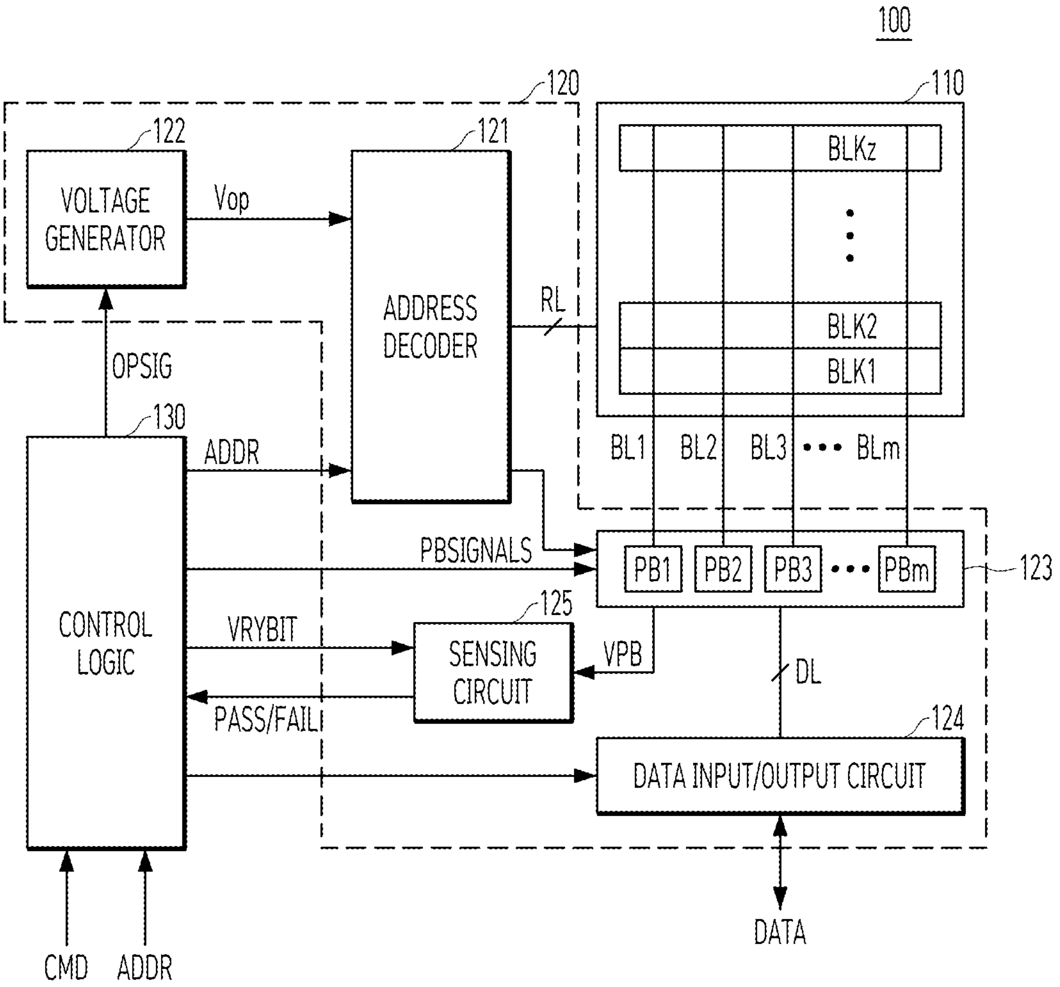
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In one embodiment, the plurality of memory cells may be nonvolatile memory cells. Memory cells connected to the same word line among the plurality of memory cells may be defined as one page. That is, the memory cell array 110 may be configured as a plurality of pages. In one embodiment, the page may be a unit for storing data or reading stored data. The memory block may be a unit for erasing data. In one embodiment, each of the plurality of memory blocks BLK1 to BLKz included in the memory cell array 110 may include a plurality of dummy memory cells. At least one of the dummy memory cells may be connected in series between a drain select transistor and the memory cells and between a source select transistor and the memory cells.

Each of the memory cells of the memory device 100 may be configured as a single level cell (SLC) that stores one bit of data, a multi-level cell (MLC) that stores two bits of data, a triple level cell (TLC) that stores three bits of data, a quad level cell (QLC) capable of storing four bits of data, or memory cells that store five or more bits of data.

The peripheral circuit 120 may drive the memory cell array 110. For example, the peripheral circuit 120 may drive the memory cell array 110 to perform the program operation, the read operation, and the erase operation under the control of the control logic 130. As another example, the peripheral circuit 120 may apply various operation voltages to the row lines RL and the bit lines BL1 to BLm or discharge the applied voltages according to the control of the control logic 130.

The peripheral circuit 120 may include the address decoder 121, a voltage generator 122, the page buffer group 123, a data input/output circuit 124, and a sensing circuit 125.

The address decoder 121 may be connected to the memory cell array 110 through the row lines RL. The row lines RL may include drain select lines, word lines, source select lines, and a source line. In one embodiment, the word lines may include normal word lines and dummy word lines. In one embodiment, the row lines RL may further include a pipe select line.

The address decoder 121 may be configured to operate in response to the control of the control logic 130. The address decoder 121 may receive an address ADDR from the control logic 130.

The address decoder 121 may be configured to decode a block address of the received address ADDR. The address decoder 121 may select at least one memory block among the memory blocks BLK1 to BLKz according to the decoded block address. The address decoder 121 may be configured to decode a row address of the received address ADDR. The address decoder 121 may select at least one word line of the selected memory block by applying voltages provided from the voltage generator 122 to at least one word line WL according to the decoded row address.

During the program operation, the address decoder 121 may apply the program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

The erase operation of the memory device 100 may be performed in a memory block unit. The address ADDR input to the memory device 100 during the erase operation may include a block address. The address decoder 121 may decode the block address and select one memory block according to the decoded block address. During the erase operation, the address decoder 121 may apply a ground voltage to the word lines connected to the selected memory block.

The address decoder 121 may be configured to decode a column address of the transmitted address ADDR. The decoded column address may be transmitted to the page buffer group 123. As an example, the address decoder 121 may include a component such as a row decoder, a column decoder, and an address buffer.

The voltage generator 122 may be configured to generate a plurality of operation voltages Vop by using an external power voltage supplied to the memory device 100. The voltage generator 122 may operate in response to the control of the control logic 130.

As an example, the voltage generator 122 may generate an internal power voltage by regulating the external power voltage. The internal power voltage generated by the voltage generator 122 is used as an operation voltage of the memory device 100.

In one embodiment, the voltage generator 122 may generate the various operation voltages Vop used for the program, read, and erase operations in response to an operation signal OPSIG. The voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The page buffer group 123 may include first to m-th page buffers PB1 to PBm. The first to m-th page buffers PB1 to PBm may be connected to the memory cell array 110 through first to m-th bit lines BL1 to BLm, respectively. The first to m-th page buffers PB1 to PBm may operate in response to the control of the control logic 130.

The first to m-th page buffers PB1 to PBm may communicate data DATA with the data input/output circuit 124. At a time of programming, the first to m-th page buffers PB1 to PBm may receive the data DATA through the data input/output circuit 124 and data lines DL.

During the program operation, the first to m-th page buffers PB1 to PBm may transmit the data DATA received through the data input/output circuit 124 to the selected memory cells through the bit lines BL1 to BLm. The memory cells of the selected page may be programmed according to the transmitted data DATA. A memory cell connected to a bit line to which a program allowable voltage (for example, a ground voltage) is applied may have an increased threshold voltage. A threshold voltage of a memory cell connected to a bit line to which a program inhibit voltage (for example, a power voltage) is applied may be maintained. During the program verify operation, the first to m-th page buffers PB1 to PBm may read the data DATA stored in the memory cells from the selected memory cells through the bit lines BL1 to BLm.

During the read operation, the page buffer group 123 may read the data DATA from the memory cells of the selected page through the bit lines BL and store the read data DATA in the first to m-th page buffers PB1 to PBm.

During the erase operation, the page buffer group 123 may float the bit lines BL. In one embodiment, the page buffer group 123 may include a column selection circuit.

In one embodiment, while data stored in some of the page buffers among the plurality of page buffers included in the page buffer group 123 is programmed in the memory cell array 110, other page buffers may receive new data from the memory controller 200 and store the new data.

The data input/output circuit 124 may be connected to the first to m-th page buffers PB1 to PBm through the data lines DL. The data input/output circuit 124 may operate in response to the control of the control logic 130.

The data input/output circuit 124 may include a plurality of input/output buffers (not shown) that receive input data DATA. During the program operation, the data input/output circuit 124 may receive the data DATA to be stored from an external controller (not shown). During the read operation, the data input/output circuit 124 may output the data DATA transmitted from the first to m-th page buffers PB1 to PBm included in the page buffer group 123 to the external controller.

During the read operation or the verify operation, the sensing circuit 125 may generate a reference current in response to a signal of an allowable bit VRYBIT generated by the control logic 130 and may compare a sensing voltage VPB received from the page buffer group 123 with a reference voltage generated by the reference current to output a pass signal or a fail signal to the control logic 130. For example, the sensing circuit 125 may output the pass signal to the control logic 130 when a magnitude of the sensing voltage VPB is greater than the reference voltage. As another example, the sensing circuit 125 may output the fail signal to the control logic 130 when the magnitude of the sensing voltage VPB is less than the reference voltage.

The control logic 130 may be connected to the address decoder 121, the voltage generator 122, the page buffer group 123, the data input/output circuit 124, and the sensing circuit 125. The control logic 130 may be configured to control all operations of the memory device 100. The control logic 130 may operate in response to a command CMD transmitted from an external device.

The control logic 130 may generate various signals in response to the command CMD and the address ADDR to control the peripheral circuit 120. For example, the control logic 130 may generate the operation signal OPSIG, the address ADDR, a page buffer control signal PBSIGNALS, and the allowable bit VRYBIT in response to the command CMD and the address ADDR. The control logic 130 may output the operation signal OPSIG to the voltage generator 122, output the address ADDR to the address decoder 121, output the page buffer control signal PBSIGNALS to the page buffer group 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
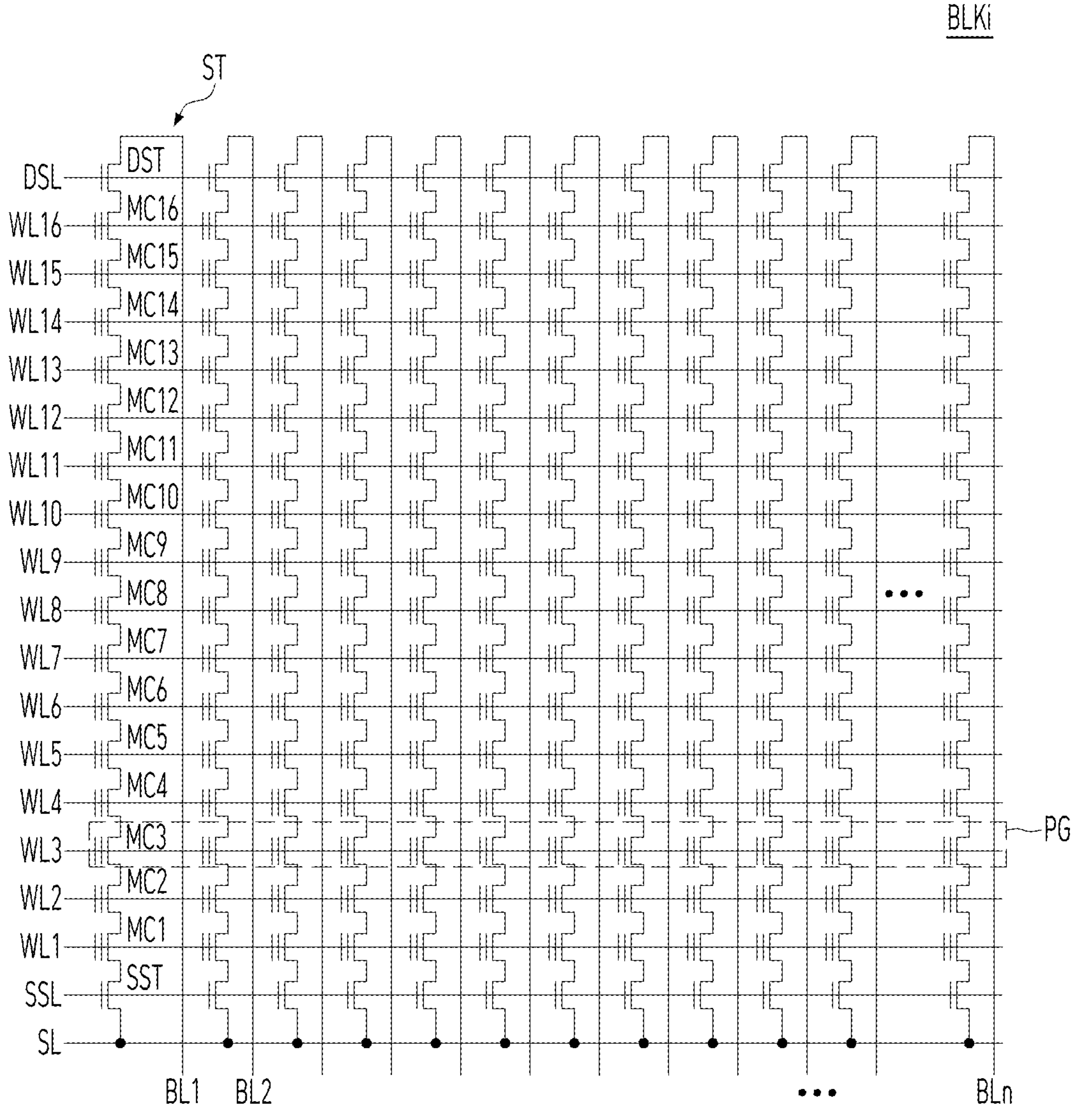
FIG. 3 is a diagram illustrating a structure of a memory block among a plurality of memory blocks BLK1 to BLKz of FIG. 2 according to an embodiment of the present disclosure.

FIG. 3 is a diagram illustrating a structure of a memory block among the plurality of memory blocks BLK1 to BLKz of FIG. 2 according to an embodiment of the present disclosure.

The memory block BLKi may be a memory block BLKi among the memory blocks BLK1 to BLKz shown in FIG. 2.

Referring to FIG. 3, a plurality of word lines arranged in parallel with each other between a first select line and a second select line may be connected. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured identically to each other, a string ST connected to the first bit line BL1 is specifically described as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and a number of memory cells MC1 to MC16 may also be included which is more than the number shown in the drawing.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a physical page PG. Therefore, the memory block BLKi may include the physical pages PG of the number of the plurality of word lines WL1 to WL16.

One memory cell may store one bit of data. This is commonly referred to as the SLC. In this case, one physical page PG may store one logical page (LPG) data. One logical page (LPG) data may include a number of data bits as the number of cells included in one physical page PG.

One memory cell may store two or more bits of data. In this case, one physical page PG may store two or more logical page (LPG) data.

Figure 4:
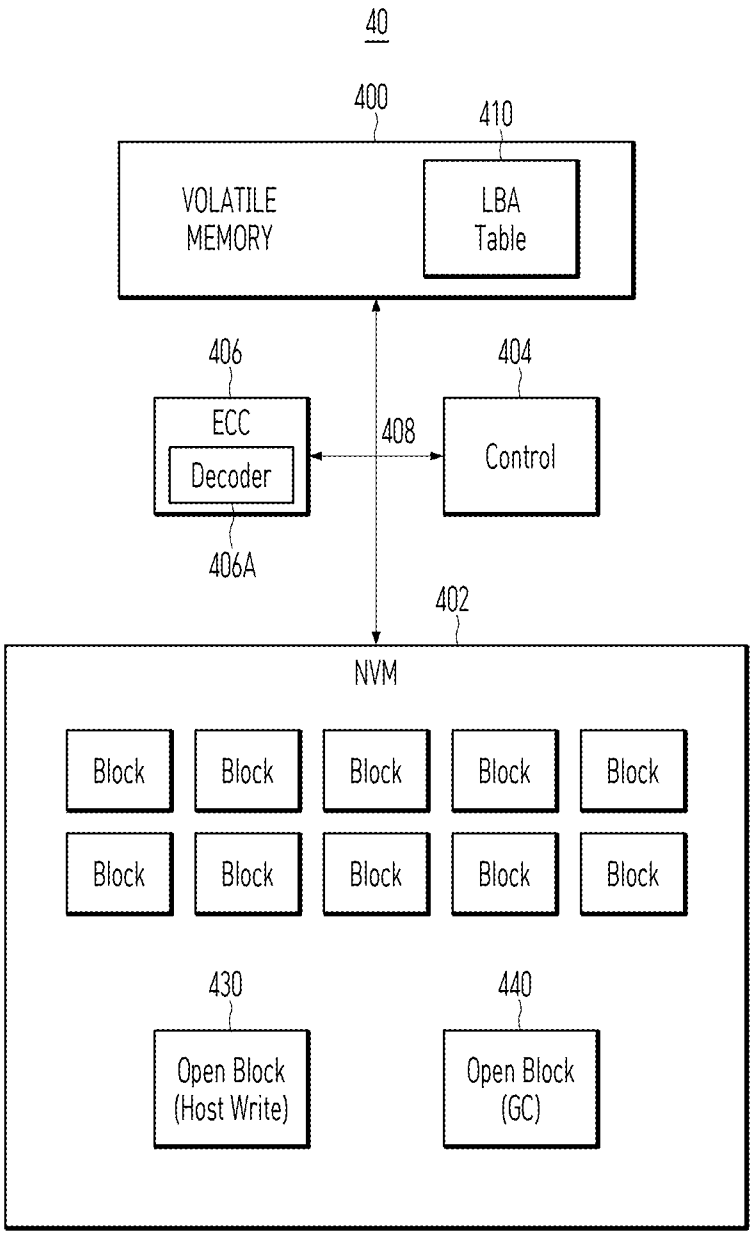
FIG. 4 is a diagram of an exemplary memory system in accordance with an embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. The memory system 40 shows a general memory system. Additional/alternative components that may be utilized with memory systems to effectuate the present invention will be understood to those of skill in the art in light of this disclosure.

As referred to herein, terms such as “NAND” or “NVM” may refer to non-volatile memories such as flash memories which may implement error correcting code processes. Further, “DRAM” may refer to volatile memories which may include components such as controllers and ECC modules.

In embodiments of the present invention, the memory system 10 may include multiple decoders that are configured to decode low-density parity-check (LDPC) codes.

There are many iterative decoding algorithms for LDPC codes, such as bit-flipping (BF) decoding algorithms, belief-propagation (BP) decoding algorithms, sum-product (SP) decoding algorithms, min-sum (MS) decoding algorithms, and Min-Max decoding algorithms.

Figures 5, 6:
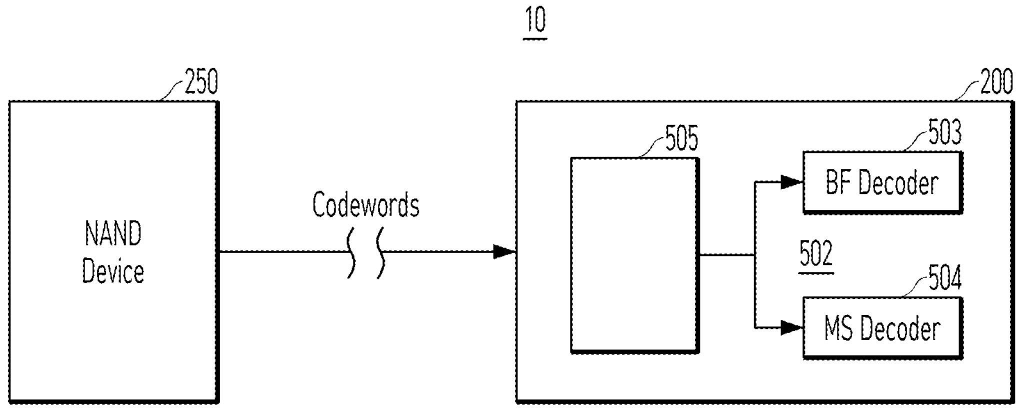
FIG. 5 is a diagram of an exemplary memory system including different decoders in accordance with an embodiment of the present invention.
FIG. 6 is a depiction of a matrix of a LDPC code.

In accordance with embodiments of the present invention, and as shown in FIG. 5, the memory system 10 may include the memory device 250, which may be a NAND device, and the memory controller 200. The memory system 10 may include decoding assembly 502, which includes a bit-flipping (BF) decoder 503 to execute a BF decoding algorithm to decode codewords read from the memory device 250 and a min-sum (MS) decoder 504 to execute an MS decoding algorithm. The BF decoder 503 and the MS decoder 504 may be embodied in the ECC module 406 (shown in FIG. 4) in the memory controller 200 or in any other suitable location. The codewords received from the memory device 250 by the memory controller 200 may be temporarily stored in a buffer or storage 505 of the memory controller 200 before being passed to one or the other of the decoders. In one embodiment of the present invention, the MS decoder 504 is a hybrid precision MS decoder (noted above and described in more detail below).

The memory system 10 may include other components (not shown) such as a checksum module, which computes checksums of codewords retrieved from the memory device 250 before decoding. The checksum module may be embodied within the memory controller 200 before the storage 505. The memory system 10 may further include cyclic redundancy check (CRC) modules disposed downstream of the BF decoder 503 and MS decoder 504, respectively. The CRC modules may be embodied within the memory controller 100.

With respect to the two decoding algorithms, MS decoding, performed by its associated decoder 504, is more powerful due to its higher complexity required to process soft input information. However, the less powerful BF decoding, performed by its associated decoder 503, is useful when the number of errors is low.

MS decoding can be used as part of an iterative LDPC decoding. LDPC codes are linear block codes defined by a sparse parity-check matrix H, which consists of zeros and ones. The term “sparse matrix” is used herein to refer to a matrix in which a number of non-zero values in each column and each row is much less than its dimension. The term “column weight” is used herein to refer to the number of non-zero values in a specific column of the parity-check matrix H. The term “row weight” is used herein to refer to number of non-zero values in a specific row of the parity-check matrix H. In general, if column weights of all of the columns in a parity-check matrix corresponding to an LDPC code are similar, the code is referred to as a “regular” LDPC code. On the other hand, an LDPC code is called “irregular” if at least one of the column weights is different from other column weights. Usually, irregular LDPC codes provide better error correction capability than regular LDPC codes.

LDPC codes are usually represented by bipartite graphs. One set of nodes, the variable or bit nodes correspond to elements of the codeword and the other set of nodes, e.g., check nodes, correspond to the set of parity-check constraints satisfied by the codeword. Typically, the edge connections are chosen at random. The error correction capability of an LDPC code is improved if cycles of short length are avoided in the graph. In a (r,c) regular code, each of the n variable nodes (V1, V2, . . . , Vn) has connections to r check nodes and each of the m check nodes (C1, C2, . . . , Cm) has connections to c bit nodes. In an irregular LDPC code, the check node degree is not uniform. Similarly, the variable node degree is not uniform. In QC-LDPC codes, the parity-check matrix H is structured into blocks of p×p matrices such that a bit in a block participates in only one check equation in the block, and each check equation in the block involves only one bit from the block. In QC-LDPC codes, a cyclic shift of a codeword by p results in another codeword. Here p is the size of square matrix which is either a zero matrix or a circulant matrix. This is a generalization of a cyclic code in which a cyclic shift of a codeword by 1 results in another codeword. The block of p×p matrix can be a zero matrix or cyclically shifted identity matrix of size p×p.

Figure 7A:
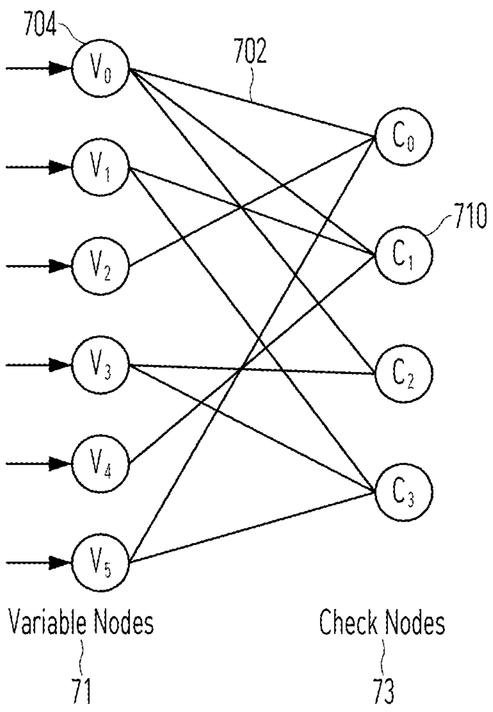
FIGS. 7A and 7B illustrate a Tanner graph representation of the LDPC code and user bits, check nodes and parity bits.

FIG. 6 illustrates an example parity-check matrix H 600, and FIG. 7A illustrates an example bipartite graph corresponding to the parity-check matrix 600.

Figure 7B:
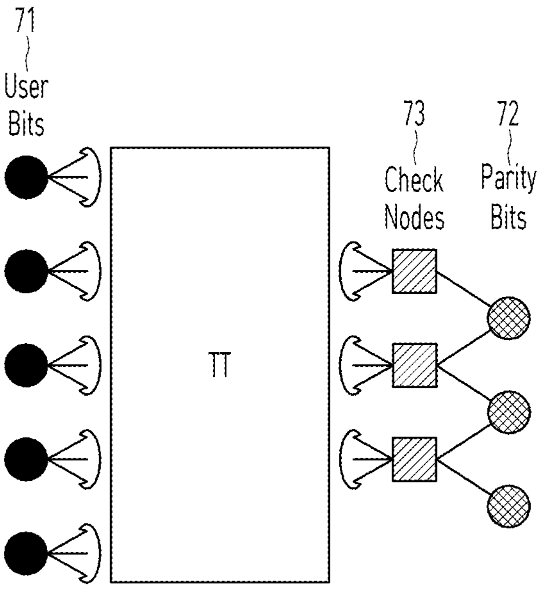

As shown in FIG. 6, the illustrative parity-check matrix 600 has six column vectors and four row vectors. Network 702 shown in FIG. 7A shows the network corresponding to the parity-check matrix 600 and represent a bipartite graph. Various types of bipartite graphs are possible, including, for example, a Tanner graph. A Tanner graph representation of an LDPC code, with user bits 71, parity bits 72 and check nodes 73, is shown in FIG. 7B.

In general, the variable nodes in network 702 correspond to the column vectors in the parity-check matrix 600. The check nodes in network 702 correspond to the row vectors of the parity-check matrix 600. The interconnections between the nodes are determined by the values of the parity-check matrix 200. Specifically, a "1" indicates the corresponding check node and variable nodes have a connection. A "0" indicates there is no connection. For example, the "1" in the leftmost column vector and the second row vector from the top in the parity-check matrix 600 corresponds to the connection between the variable node 704 and the check node 710.

A message passing algorithm may be used to decode LDPC codes. Several variations of the message passing algorithm exist in the art, such as min-sum (MS) algorithm, sum-product algorithm (SPA) or the like. Message passing uses a network of variable nodes and check nodes, as shown in FIG. 7A.

A hard decision message passing algorithm may be performed. In a first step, each of the variable nodes sends a message to one or more check nodes that are connected to it. In this case, the message is a value that each of the variable nodes believes to be its correct value.

In the second step, each of the check nodes calculates a response to send to the variable nodes that are connected to it using the information that it previously received from the variable nodes. This step can be referred as the check node update (CNU). The response message corresponds to a value that the check node believes that the variable node should have based on the information received from the other variable nodes connected to that check node. This response is calculated using the parity-check equations which force the values of all the variable nodes that are connected to a particular check node to sum up to zero (modulo 2).

At this point, if all the equations at all the check nodes are satisfied, the decoding algorithm declares that a correct codeword is found and it terminates. If a correct codeword is not found, the iterations continue with another update from the variable nodes using the messages that they received from the check nodes to decide if the bit at their position should be a zero or a one by a majority rule. The variable nodes then send this hard decision message to the check nodes that are connected to them. The iterations continue until a correct codeword is found, a certain number of iterations are performed depending on the syndrome of the codeword (e.g., of the decoded codeword), or a maximum number of iterations are performed without finding a correct codeword.

At each iteration of the decoding, the systematic (user) bits 71 and the low-degree parity bits 72 (such as shown in FIG. 7B), may be decoded alternatively. The user bits 71 may be decoded one-by-one using for example MS operations. The low-degree parity bits may be jointly decoded using the results of the user bits 71. The results from the joint decoding may be used for the next iteration.

Figure 7C:
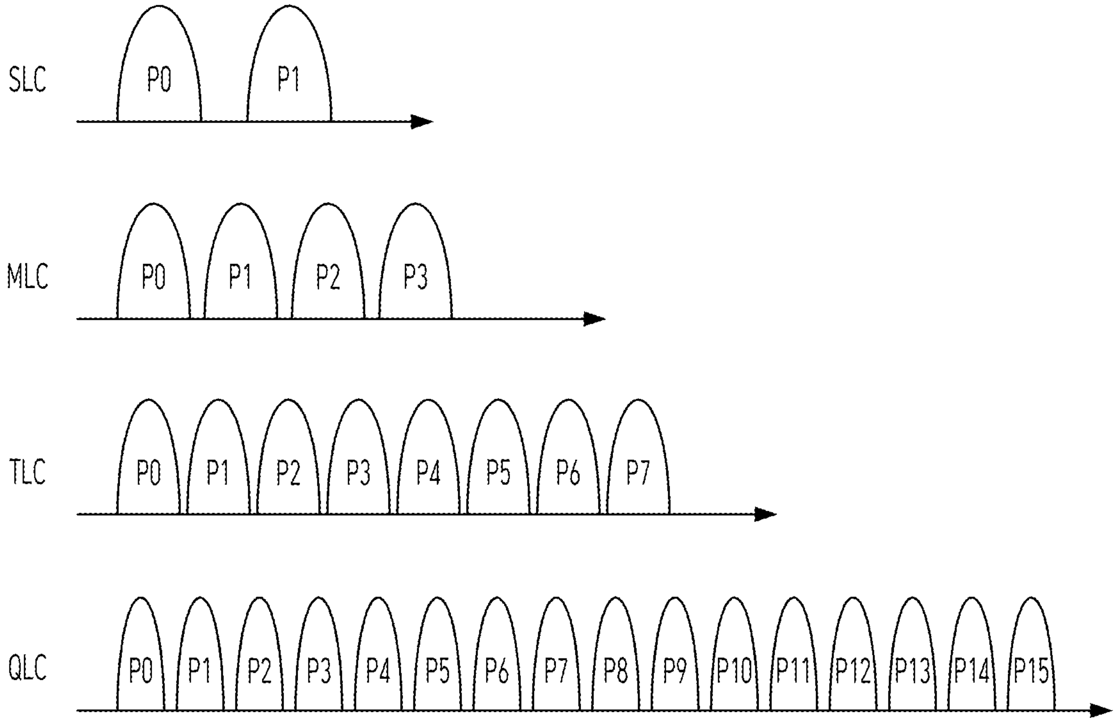
FIG. 7C is a diagram illustrating distributions of states or program voltage (PV) levels for different types of cells of a memory device.

FIG. 7C is a diagram illustrating distributions of states or program voltage (PV) levels for different types of cells of a memory device.

Referring to FIG. 7C, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 100 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

As an example of setting threshold voltages, consider the TLC in which one memory cell stores three bits of data. The initial state of the TLC may be the state in which a program operation has not been performed and in which the threshold voltage distributions of the memory cells are all in the erase state E. Following programming, each of the memory cells may have a threshold voltage corresponding to one of a plurality of program states. Each of the memory cells on which the program operation has been performed may have a threshold voltage corresponding to one of the erase state P0 (E) and the first to seventh program states P1 to P7, as shown in FIG. 7C for the TLC example. The threshold voltage of each memory cell in the initial state may be increased to the threshold voltage corresponding to one of the erase state P0 and the first to seventh program states P1 to P7 through the program operation.

The program operation may include a plurality of program loops PL1 to PLn applied to each of selected memory cells coupled to a selected word line so that the memory cells have threshold voltages corresponding to the plurality of program states. Each of the plurality of program loops PL1 to PLn may include a program voltage apply operation (PGM Step) and a verify operation (Verify Step).

The program voltage apply operation (PGM Step) may be an operation of applying the program voltage to the selected word line coupled to the selected memory cells. In the program voltage apply operation (PGM Step), the threshold voltages of the selected memory cells may be increased by the program voltage.

The verify operation (Verify Step) may be an operation of applying a verify voltage to the selected word line coupled to the selected memory cells. The verify operation (Verify Step) may be an operation of identifying the threshold voltages of the memory cells increased by the program voltage apply operation. In detail, the verify operation (Verify Step) may be an operation of obtaining sensed data through a bit line coupled to memory cells when the verify voltage is applied to the word line coupled to the memory cells. During the verify operation (Verify Step), when the threshold voltage of each of the memory cells is greater than the verify voltage, data corresponding to an off-cell may be sensed. During the verify operation (Verify Step), when the threshold voltage of each of the memory cells is less than the verify voltage, data corresponding to an on-cell may be sensed.

NAND Flash Operation

In one embodiment of the present disclosure, systems and methods are provided that can significantly improve (shorten) the effective program-time. In one embodiment of the present disclosure, many steps of a conventional main-program-verify sense operation can be eliminated. In one embodiment, a dual-program-verify sense operation (for even first program-verify pulse loop) can be performed testing if threshold levels have been programmed. In the dual-program-verify sense operation, a sense operation indicating that a cell has not been programmed to a proper voltage threshold follows then by applying a bias to the improperly programmed memory cell to "soft program" the memory cell to the proper voltage threshold. In another embodiment, the present disclosure takes advantage that there are slow-to-program cells and fast-to-program cells, and configures a dual-program-verify evaluation operation to reduce the dual-program-verify evaluation time to eliminate program-verify pulses that would otherwise take place on slow-to-program cells. In another embodiment, a program-pulse-loop count can be used for each program-verify level to eliminate additional program-verify pulses that would otherwise take place on the slow-to-program cells.

Figure 8A:
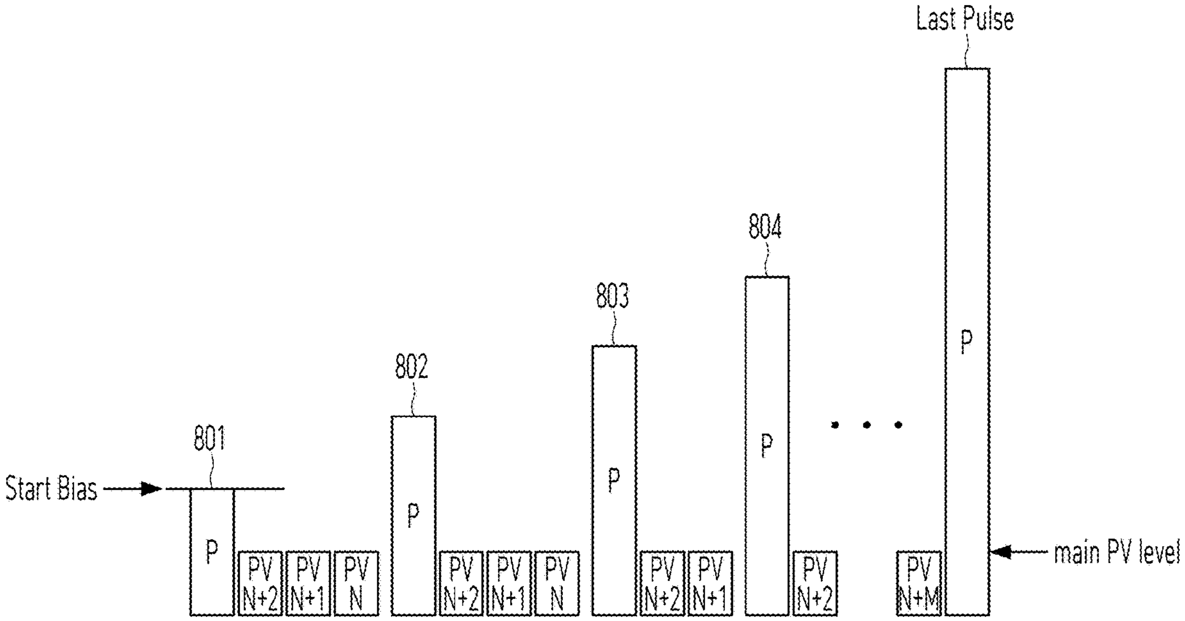
FIG. 8A is a schematic representation of a program operation in accordance with one embodiment of the present invention.

During a program operation of Multi-Level NAND, memory cells are typically programmed into one of 2N possible threshold voltages to store N bits of information. For example, similar to that noted above, the initial state of the Multi-Level NAND may be the state in which a program operation has not been performed and in which the threshold voltages of the memory cells are all in the erase state E. Following programming, each of the memory cells may have a threshold voltage corresponding to one of a plurality of program states of the Multi-Level NAND. Each of the memory cells on which the program operation has been performed may have a threshold voltage corresponding to one of the erase state E (P0) and (in the case of a TLC) the first to seventh program states P1 to P7, as shown in FIG. 7C. The threshold voltage can be achieved by applying (as shown in FIG. 8A) a series of program pulses P (e.g., pulses 801, 802, 803, 804, . . . ) with increasing bias magnitude to the control gate of targeted NAND cells. Each program pulse is followed by a series of verify steps (program verify PV pulses and sensing) to compare the threshold voltage of the targeted NAND cells against a specific program verify level. FIG. 8A illustrates the program verify PV pulses at a "main level." This depiction does not imply that the program verify PV pulses are all at the same voltage level or that voltage levels of the program verify PV pulses cannot be adjusted. As used herein, the application of one program pulse followed by the series of verify steps is referred to as a program loop.

In order to be able to successfully store N bits of information per cell, the cells are programmed to one of the $2^N$ possible threshold voltages. In one embodiment, the Vt distribution must be compact for successfully reading the data at each program-level. For example, for TLC programming, all states (8 states: E, PV1, PV2, . . . , PV7) must fit within a specified voltage-range determined by process/technology. To achieve that it is important to have each PV state "compact" enough to fit-in all the 8 states in that voltage-range while avoiding any overlaps and allowing enough valley-margin between the states for reliable read(s). A dual-program (DPGM) method can be used to achieve a desirable memory cell Vt distribution by first identifying those cells having a Vt close to program-verify level (by performing an additional dual-program-verify sense), and then selectively "soft programming" those cells close to program-verify level by applying a non-zero BL bias to those cells to improve the right edge (higher energy side) of the cell Vt distribution for each program-verify levels.

The ideal condition to achieve programming would be to have 0 V in BL/Channel and Vpgm on GATE of selected WL. Such ideal programming on a cell with its Vt closer to PV may place the cell Vt beyond the right edge. (also known as over-programming) By increasing BL/Channel bias to be slightly above OV, programming is slowed down. For example, with such a condition for the same Vpgm on GATE of selected WL, the cell Vt would move a little less causing a soft programming. Hence, with such controlled slow programming, the right edge of distribution improves as it avoids the over-programming.

Generally, memory cells targeted to store data in the lower program-verify levels in a QLC obtain their target Vt state at an earlier stage of programming compared to cells targeted to store data at higher program-verify levels in the QLC. Hence, the present disclosure recognized that it is inefficient to verify all the program-verify levels after each program pulse. A method known as Program-Verify-Blind can be used to efficiently utilize the program-verify levels as function of program-pulse-loop count so that, during earlier program-pulse-loops, the lower program-verify levels are verified, and higher program-verify levels are omitted from verification. During later program-pulse-loops, the higher program-verify levels (not earlier verified) are verified. This method can improve the overall program-time by eliminating the unnecessary program-verify steps after each program-pulse P.

Figure 8B:
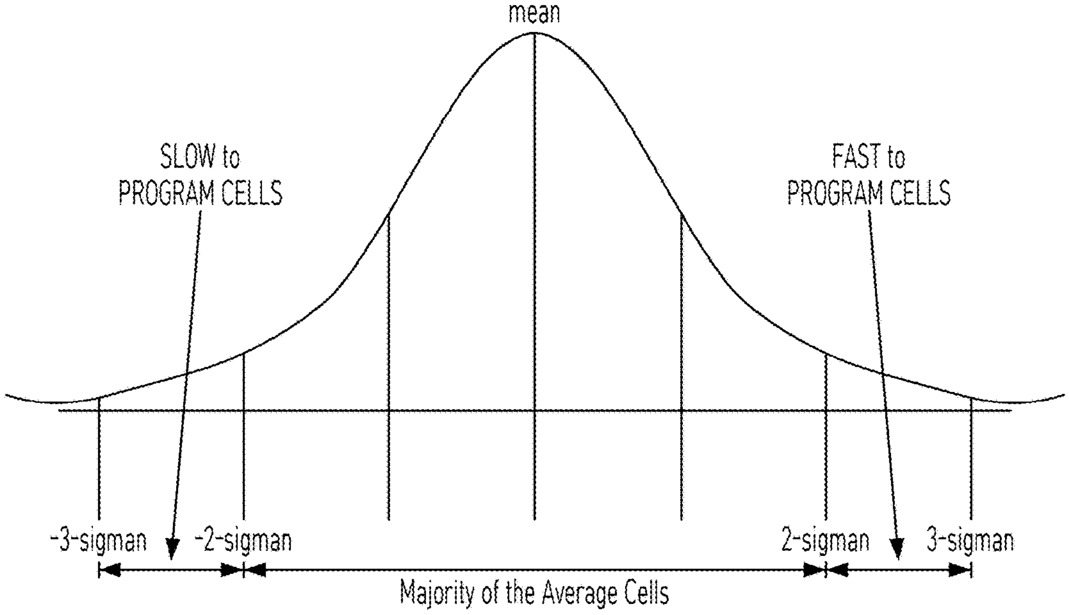
FIG. 8B is a schematic representation of the distribution of memory cells based on a speed to program the memory cells in accordance with one embodiment of the present invention.

As shown in FIG. 8B, a normal distribution of all the NAND cells (in a page across the multi-planes) with respect to their program-speed is shown. NAND Cell programming speed follows a normal/Gaussian distribution due to process variation, material properties, charge-trapping effects etc. Validation of the results shown in FIG. 8B can be had by performing an erase operation followed by a single pulse program followed by reads at different voltages which would result a Gaussian Distribution plot with majority cells between +−2 sigma. The Gaussian Distribution is simply a representation of fast/slow cells being a minority. As shown in FIG. 8B, the majority of the cells (average-time-to-program cells) are positioned around the mean, fast-to-program cells are positioned to the right side around +2 to +3 sigma, and slow-to-program cells are positioned to the left side around −2 to −3 sigma. During the application of program pulses P, the fast-to-program cells may reach their target cell Vt prior to the average-to-program cells, and the average-to-program cells may reach their target cell Vt prior to the slow-to-program cells.

At a given program-verify level, the fast-to-program cells are assigned to a "DPGM bucket" when their Vt following the first program pulse P is greater than a voltage of the dual-program-verify level and less than the main-program-verify level of a particular threshold voltage level, for example less than the voltage level PV0. Accordingly, during the next program-pulse P, those cells in the DPGM bucket are soft programmed by selectively applying the non-zero BL bias to program their Vt to be greater than the main-program-verify level while maintaining the compact cell Vt distribution. Later, during a subsequent program-verify operation, those cells assigned to the DPGM bucket may pass for the main-program-verify level, and thereafter may be inhibited from program-verify level testing for all future program pulses.

Figure 9:
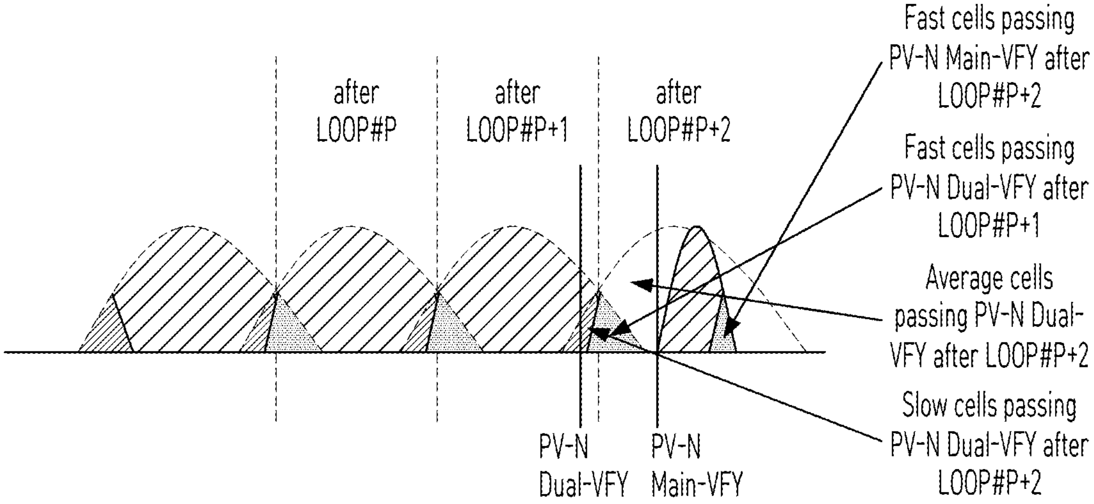
FIG. 9 is a schematic representation of a program loop operation in accordance with one embodiment of the present invention.

FIG. 9 illustrates the Vt progression of the cells targeted to store data at a PV-N as a function of the Program-Pulse-Loop count. The FIG. 9 distribution is for targeted page cells with respect to their Vt state with the fast-to-program cells being placing on the right side of the distributions in FIG. 9, and the slow-to-program cells placing on the left side of the distributions in FIG. 9. The PV-N MAIN-VFY controls the left edge of final Vt distribution for given PV level(s). The PV-N DUAL-VFY controls the right edge of final Vt distribution for that PV level. Using a controlled programming along with ideal and soft programming approaches, desired compact Vt distributions are achieved.

Here, the PV-N Program-Verify-Blind operation (where lower program-verify levels are sensed and verified, and higher program-verify levels are omitted from sensing) are set to LOOP #P which means that, after starting LOOP #P, a PV-N program-verify pulse operation starts. For each distribution in FIG. 9, there are fast-to program cells on the right side and slow-to-program cells on the left side, and the remaining cells in the middle represent the average-time-to-program cells noted above.

After LOOP #P, in FIG. 9, none of the cells pass for the PV-N Dual-VFY or Main-VFY operations, so potentially the voltage level of the PV-N Program-Verify-Blind operation may be adjusted (increased) for the LOOP #P+1 operation. Here, the term "VFY" means "verify".

Then, after the LOOP #P+1 operation, the fast-to-program cells (ones programed with the lower energy states of PV1 to PV7 shown in FIG. 7C) may pass the PV-N Dual-VFY operation but may fail a PV-N Main-VFY operation where all the series of PV pulses are applied and a sense current measured after each PV pulse, and the failed cells (the ones that failed one of sense current measurements) are placed in the DPGM bucket noted above. Here, the PV-N Main-VFY operation may be skipped while still performing the PV-N Dual-VFY operation or soft programming operation at each PV pulse, however, doing so may take away margins for safety and concern the reliability.

Even though adjusting voltage levels of the PV-N Program-Verify-Blind operations from LOOP #P to LOOP #P+1 and/or skipping PV-N Main-VFY operation while still performing PV-N Dual-VFY operations for LOOP #P+1 may have risk regarding reliability, skipping the PV-N Main-VFY operation while still performing PV-N Dual-VFY operation for LOOP #P is fairly safe and represents a low-risk approach to improve the programming time.

The method discussed in this disclosure provides an individual control for each program-verify level to skip the PV-X Main-VFY operation while still performing the PV-X Dual-VFY operation only for the first program-verify pulse operation for each program-verify level, and thereby improving the program time.

In one embodiment of the present disclosure, during the program-verify operation, the selected wordline (WL) associated with the memory cell being programmed is biased to the Main-VFY voltage, unselected WLs are biased to a Pass voltage, bit-lines and sensing nodes are pre-charged to the sense voltage, and then after a unit evaluation time (tEVAL) a sense operation is performed.

If the Vt of the targeted cell is less than the Main-VFY voltage, then the string conducts, and Bit-Line draws more current which discharges the sensing node, signifying verify-fail. If the Vt of the targeted cell is greater than the Main-VFY voltage, then the string does not conduct and sensing node stays pre-charged signifying the verify-pass.

To improve the program-performance, rather than performing a Dual-VFY sense and Main-VFY sense using two different WL voltages, in one embodiment, an evaluation time based method is used where a shorted evaluation time equates to the Dual-VFY sense and a comparatively longer evaluation time equates to the Main-VFY sense.

Figure 10:
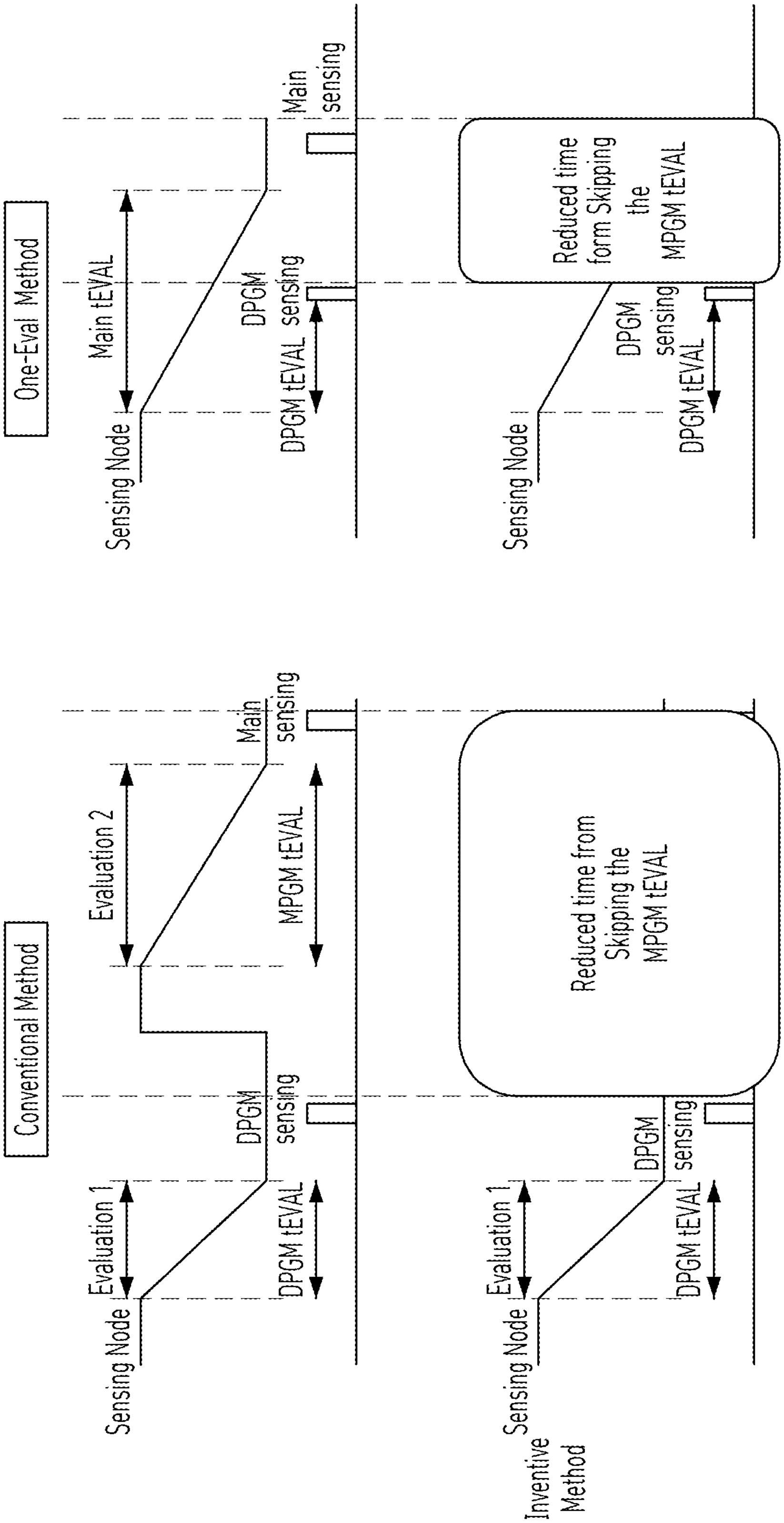
FIG. 10 is diagram comparing different times to program memory cells in accordance with one embodiment of the present invention used to read data from a memory.

FIG. 10 illustrates the comparisons with different methods and one embodiment of the novel method of the present disclosure. FIG. 10 shows a conventional method where after all the PV pulses were applied and before a subsequent programming pulse P was applied, a Main-VFY sense operation occurs. Typically, as denoted in the upper right quadrant of FIG. 10, the Main-VFY sense operation is the only sense operation. FIG. 10 shows in the lower half according to one embodiment, for the first program-verify pulse of a program-verify level loop, the inventive method improved (reduces) the program-time by skipping the MPGM-tEVAL.

FIG. 11 illustrates how each program-verify level may skip the Main-VFY while still performing the Dual-VFY throughout the programming for program-time improvement.

Figure 12:
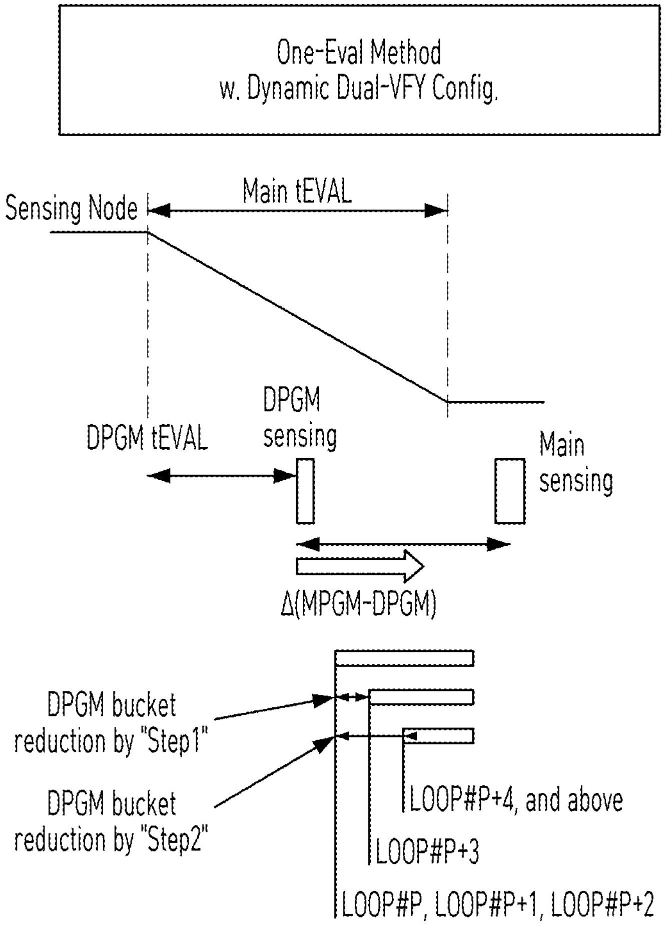
FIG. 12 is diagram comparing different program timing controls used in programming memory cells in accordance with one embodiment of the present invention used to read data from a memory.

Referring to FIG. 12, the delta between the Main tEVAL time and the DPGM tEVAL time may be the time allotted to perform the sensing/verification on for example the fast-to-program cells assigned to the DPGM bucket (where soft programming can be used to adjust the threshold voltages). To ensure a tight cell Vt distribution, the time to process (sense/verify) any cells assigned to the DPGM bucket may be defined based on a worst case time, and the same time for performing sensing/verification on any cells in the DPGM bucket may be used for all the cells.

The difference in the program speed among the cells may be due to many factors. If the speed difference between the cells is due to the program-slope variation, then fast-to-program cells may require a wider DPGM time bucket compared to the majority of the average-time-to-program cells, and the majority of the average time to program cells may require a wider DPGM time bucket compared to the slow-to-program cells.

If the widest DPGM time bucket is used for all three categories of the cells. then it may slow down the programming of the cells even more, and therefore taking multiple DPGM program-pulse-loops to reach the target cell Vt, which would worsen the total program-time.

The method discussed in this disclosure provides an option to dynamically configure the DPGM time bucket by adjusting the DPGM tEVAL time as function of Program-Pulse-Loop count for each program-verify level to efficiently avoid over-programming (where cells are programmed to a higher Vt than the desired right edge of the distribution causing wider and/or overlapping distributions) of the cells without degrading the program-time.

FIG. 12 and FIG. 13 illustrate the visual representation of this embodiment, where as shown in FIG. 12, the DPGM time bucket is reduced by increasing the DPGM tEVAL time as function of Program-Pulse-Loop count. Here, the Start-Loop is configured as LOOP #3 where first the DPGM bucket is reduced by step1, and then LOOP #4 and above reduces the DPGM bucket by step2.

FIG. 13 illustrates how each program-verify level is individually controlled to define the Start-Loop from where the step1 offset is applied, followed by next few loops for which step2 offset is applied until that program-verify level passes.

Here, the "DYN_DPGM_START_LOOP_PV*" is a separate control for each program-verify level specifying the Start-Loop from which DPGM tEVAL can be changed by "DYN_DPGM_STEP1" value. All the loops that follow (until a specific program-verify level is passed) would change the DPGM tEVAL by the "DYN_DPGM_STEP2" value.

FIG. 13 specifically shows an example for the program-verify level PV6 where the Program-Verify-Blind setting for the PV6 is "7", and the DYN_DPGM_START_LOOP_PV6 is "2".

Here, the PV6 program-verify pulse starts at LOOP #7, where regular DPGM tEVAL is used, a second loop from the PV6 start loop (which would be LOOP #8) is where the DPGM tEVAL is updated by the "DYN_DPGM_STEP1", and from LOOP #9 until when PV6 passes on LOOP #11, the DPGM tEVAL is updated by the "DYN_DPGM_STEP2".

In this case instead of taking conventionally a total of 5 program-verify pulses (from LOOP #7 to LOOP #11), now PV6 programming may be completed with 4 program-verify pulses (from LOOP #7 to LOOP #10). The reduced time (due to the reduced number of program-verify pulses) to process the cells in the DPGM Bucket from LOOP #9 onwards may prevent the further slowing down of the slow-to-program cells, and the programming of the PV6 cells is complete by LOOP #10.

Innovative Aspects for Programming Memory Cells

By using the methods described above, in one embodiment, the main-program-verify sense operation may be skipped while still performing the dual-program-verify sense operation for the very first program-verify pulse of each program-verify level, and the dual-program-verify level may be configured as a function of program-pulse-loop count for each program-verify level to improve the effective program time.

In one embodiment, program Time (tPROG) improvement by eliminating the main-program-verify sense operation while still performing the dual-program-verify sense operation for the very first program-verify pulse of each program-verify level.

In one embodiment, individual control for each program-verify level to skip the Main-VFY while still performing the Dual-VFY for the very first Program-Verify pulse to improve the program time without any reliability downside.

In one embodiment, a program Time (tPROG) improvement is realized by recognizing slow-to-program cells versus fast-to-program cells behavior and configuring a dual-program-verify evaluation time as a function of program-pulse-loop count, where for each program-verify level eliminating an additional program-verify pulse that otherwise would have taken place, further slowing down programming of the slow to program cells.

In another embodiment, an option is provided to dynamically configure the DPGM bucket by adjusting the evaluation time DPGM tEVAL with Step1 and Step2 reductions as a function of a program-pulse-loop count, where each program-verify level avoids over-programming of the cells or degrading the program-time.

Figure 14:
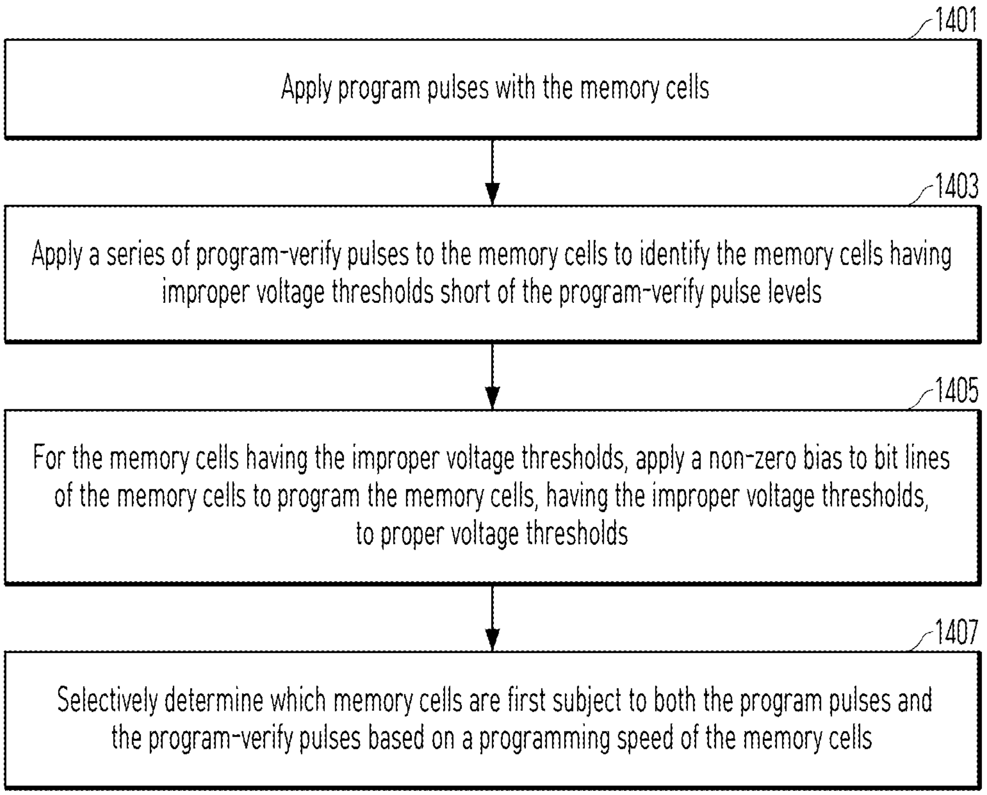
FIG. 14 is a flowchart depicting in accordance with one embodiment of the present invention a method for programming memory cells in a memory.

FIG. 14 is a flowchart depicting a method in accordance with one embodiment of the present invention for programming memory cells in a memory. A memory controller such as memory controller 200 in FIG. 2 or memory controller 200 in FIG. 5 can be used to execute this method. As illustrated in FIG. 14, at 1401, the method applies program pulses to the memory cells. At 1403, the method applies a series of program-verify pulses to the memory cells to identify the memory cells having improper voltage thresholds short of the program-verify pulse levels. At 1405, for the memory cells having the improper voltage thresholds, the method applies a non-zero bias to bit lines of the memory cells to program the memory cells, having the improper voltage thresholds, to proper voltage thresholds. At 1407, the method selectively determines which memory cells are first subject to both the program pulses and the program-verify pulses based on a programming speed of the memory cells.

In one aspect of this method, for selectively determining the memory cells subject to both the program pulses and the program-verify pulses, faster-to-program memory cells are first subject to both the program pulses and the program-verify pulses, and slower-to-program memory cells are later subject to both the program pulses and the program-verify pulses.

In one aspect of this method, applying the series of program-verify pulses to the memory cells is followed by verifying, after a first program pulse, if voltage thresholds of a selected memory cell comprise the proper voltage thresholds without verifying all voltage thresholds of the selected memory cell, and the proper voltage thresholds are identified based on a level of sensing current flowing from the selected memory cell at a reference sense voltage.

In one aspect of this method, the non-zero bias is applied, to bit lines of a selected memory cell having an improper voltage threshold, to program the selected memory cell having the improper voltage threshold while verifying a change in the voltage thresholds of the selected memory cell.

In one aspect of this method, a verification of the voltage thresholds in selected memory cells applies one of the series of program-verify pulses to a selected memory cell and then senses current flowing from the selected memory cell at a reference sense voltage. The verification may determine the voltage thresholds in the selected memory cell that have a voltage less than a magnitude of the program pulse and greater than a magnitude of the program-verify pulses. The non-zero bias may be applied to bit lines of the selected memory cell having the voltage less than the magnitude of the program pulse and greater than the magnitude of the program-verify pulses;

and the biased voltage thresholds in the selected memory cell may be verified. After verifying the biased voltage thresholds in the selected memory cell, no verification of all the voltage thresholds in the selected memory cell is performed.

In one aspect of this method, with a first program-pulse-loop count, the verification of a low threshold voltage of N threshold voltages of the selected memory cell is verified and higher threshold voltages of N threshold voltages of the selected memory cell are not verified, and with a second program-pulse-loop count higher than the first program-pulse-loop count, the higher threshold voltages of the N threshold voltages are verified. In one aspect of this method, times to verify the voltage thresholds are dynamically adjusted to avoid over-programing of the memory cells.

Memory System

In the present invention, there is provided a memory system comprising a memory device; and a controller in communication with and configured to control the memory device. The controller is configured to apply program pulses to the memory cells, apply a series of program-verify pulses to the memory cells to identify the memory cells having improper voltage thresholds short of the program-verify pulse levels, for the memory cells having the improper voltage thresholds, apply a non-zero bias to bit lines of the memory cells to program the memory cells, having the improper voltage thresholds, to proper voltage thresholds, and selectively determine which memory cells are first subject to both the program pulses and the program-verify pulses based on a programming speed of the memory cells.

In one aspect of this memory system, for selectively determining the memory cells subject to both the program pulses and the program-verify pulses, the controller is configured to: first subject faster-to-program memory cells to both the program pulses and the program-verify pulses, and then subject slower-to-program memory cells to both the program pulses and the program-verify pulses.

In one aspect of this memory system, the controller is configured to apply the series of program-verify pulses to the memory cells and thereafter verify, after a first program pulse, if voltage thresholds of a selected memory cell comprise the proper voltage thresholds without verifying all voltage thresholds of the selected memory cell, and identify the proper voltage thresholds based on a level of sensing current flowing from the selected memory cell at a reference sense voltage.

In one aspect of this memory system, the controller is configured to apply the non-zero bias, to bit lines of a selected memory cell having an improper voltage threshold, to program the selected memory cell having the improper voltage threshold while verifying a change in the voltage thresholds of the selected memory cell.

In one aspect of this memory system, verification by the controller of the voltage thresholds in selected memory cells applies one of the series of program-verify pulses to a selected memory cell and then the controller senses current flowing from the selected memory cell at a reference sense voltage.

In one aspect of this memory system, the verification by the controller determines the voltage thresholds in the selected memory cell that have a voltage less than a magnitude of the program pulse and greater than a magnitude of the program-verify pulses.

In one aspect of this memory system, the controller is configured to apply the non-zero bias to bit lines of the selected memory cell having the voltage less than the magnitude of the program pulse and greater than the magnitude of the program-verify pulses, and verify the biased voltage thresholds in the selected memory cell.

In one aspect of this memory system, the controller is configured to with a first program-pulse-loop count, verify a low threshold voltage of N threshold voltages of the selected memory cell is verified and not verify higher threshold voltages of N threshold voltages of the selected memory cell, and with a second program-pulse-loop count higher than the first program-pulse-loop count, verify the higher threshold voltages of the N threshold voltages.

In one aspect of this memory system, the controller is configured to dynamically adjust times to verify the voltage thresholds to avoid over-programing of the memory cells.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for programming memory cells in a memory, comprising:

applying program pulses to the memory cells;

applying a series of program-verify pulses to the memory cells to identify the memory cells having improper voltage thresholds short of the program-verify pulse levels;

for the memory cells having the improper voltage thresholds, applying a non-zero bias to bit lines of the memory cells to program the memory cells, having the improper voltage thresholds, to proper voltage thresholds; and selectively determining which memory cells are first subject to both the program pulses and the program-verify pulses based on a programming speed of the memory cells.

2. The method of claim 1, wherein, for selectively determining the memory cells subject to both the program pulses and the program-verify pulses, faster-to-program memory cells are first subject to both the program pulses and the program-verify pulses, and slower-to-program memory cells are later subject to both the program pulses and the program-verify pulses.

3. The method of claim 1, wherein the applying the series of program-verify pulses to the memory cells is followed by verifying, after a first program pulse, if voltage thresholds of a selected memory cell comprise the proper voltage thresholds without verifying all voltage thresholds of the selected memory cell, and the proper voltage thresholds are identified based on a level of sensing current flowing from the selected memory cell at a reference sense voltage.

4. The method of claim 3, further comprising applying the non-zero bias, to bit lines of a selected memory cell having an improper voltage threshold, to program the selected memory cell having the improper voltage threshold while verifying a change in the voltage thresholds of the selected memory cell.

5. The method of claim 4, wherein a verification of the voltage thresholds in selected memory cells applies one of the series of program-verify pulses to a selected memory cell and then senses current flowing from the selected memory cell at a reference sense voltage.

6. The method of claim 5, wherein the verification determines the voltage thresholds in the selected memory cell that have a voltage less than a magnitude of the program pulse and greater than a magnitude of the program-verify pulses.

7. The method of claim 6, further comprising:

applying the non-zero bias to bit lines of the selected memory cell having the voltage less than the magnitude of the program pulse and greater than the magnitude of the program-verify pulses; and verifying the biased voltage thresholds in the selected memory cell.

8. The method of claim 7, wherein, after the verifying the biased voltage thresholds in the selected memory cell, no verification of all the voltage thresholds in the selected memory cell is performed.

9. The method of claim 5, wherein with a first program-pulse-loop count, the verification of a low threshold voltage of N threshold voltages of the selected memory cell is verified and higher threshold voltages of N threshold voltages of the selected memory cell are not verified, and with a second program-pulse-loop count higher than the first program-pulse-loop count, the higher threshold voltages of the N threshold voltages are verified.

10. The method of claim 5, wherein times to verify the voltage thresholds dynamically adjusted to avoid over-programming of the memory cells.

11. A memory system comprising:

a memory device;

a controller in communication with the memory device and configured to control the memory device, wherein the controller is configured to:

apply program pulses to the memory cells;

apply a series of program-verify pulses to the memory cells to identify the memory cells having improper voltage thresholds short of the program-verify pulse levels;

for the memory cells having the improper voltage thresholds, apply a non-zero bias to bit lines of the memory cells to program the memory cells, having the improper voltage thresholds, to proper voltage thresholds; and selectively determine which memory cells are first subject to both the program pulses and the program-verify pulses based on a programming speed of the memory cells.

12. The memory system of claim 11, wherein, for selectively determining the memory cells subject to both the program pulses and the program-verify pulses, the controller is configured to:

first subject faster-to-program memory cells to both the program pulses and the program-verify pulses, and then subject slower-to-program memory cells to both the program pulses and the program-verify pulses.

13. The memory system of claim 12, wherein the controller is configured to:

apply the series of program-verify pulses to the memory cells and thereafter verify, after a first program pulse, if voltage thresholds of a selected memory cell comprise the proper voltage thresholds without verifying all voltage thresholds of the selected memory cell, and identify the proper voltage thresholds based on a level of sensing current flowing from the selected memory cell at a reference sense voltage.

14. The memory system of claim 12, wherein the controller is configured to:

apply the non-zero bias, to bit lines of a selected memory cell having an improper voltage threshold, to program the selected memory cell having the improper voltage threshold while verifying a change in the voltage thresholds of the selected memory cell.

15. The memory system of claim 14, wherein verification by the controller of the voltage thresholds in selected memory cells applies one of the series of program-verify pulses to a selected memory cell and then the controller senses current flowing from the selected memory cell at a reference sense voltage.

16. The memory system of claim 15, wherein the verification by the controller determines the voltage thresholds in the selected memory cell that have a voltage less than a magnitude of the program pulse and greater than a magnitude of the program-verify pulses.

17. The memory system of claim 16, wherein the controller is configured to apply the non-zero bias to bit lines of the selected memory cell having the voltage less than the magnitude of the program pulse and greater than the magnitude of the program-verify pulses, and verify the biased voltage thresholds in the selected memory cell.

18. The memory system of claim 15, wherein the controller is configured to:

with a first program-pulse-loop count, verify a low threshold voltage of N threshold voltages of the selected memory cell is verified and not verify higher threshold voltages of N threshold voltages of the selected memory cell, and with a second program-pulse-loop count higher than the first program-pulse-loop count, verify the higher threshold voltages of the N threshold voltages.

19. The memory system of claim 15, wherein the controller is configured to dynamically adjust times to verify the threshold voltage thresholds to avoid over-programming of the memory cells.

* * * * *